United States Patent
Tai et al.

(10) Patent No.: US 11,526,243 B2
(45) Date of Patent: Dec. 13, 2022

(54) DRIVING METHOD OF TOUCH ELECTRONIC DEVICE

(71) Applicant: Innolux Corporation, Miao-Li County (TW)

(72) Inventors: Ming-Jou Tai, Miao-Li County (TW); Chia-Hao Tsai, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 105 days.

(21) Appl. No.: 17/094,814

(22) Filed: Nov. 11, 2020

(65) Prior Publication Data
US 2021/0165529 A1   Jun. 3, 2021

(30) Foreign Application Priority Data

Nov. 29, 2019   (CN) .......................... 201911199468.7

(51) Int. Cl.
*G06F 3/044*   (2006.01)
*G06F 3/041*   (2006.01)

(52) U.S. Cl.
CPC .......... *G06F 3/0445* (2019.05); *G06F 3/0414* (2013.01)

(58) Field of Classification Search
CPC .. G06F 3/0414; G06F 3/04166; G06F 3/0412; G06F 3/044; G06F 3/041–0445; G06F 2203/04106
See application file for complete search history.

(56) References Cited

U.S. PATENT DOCUMENTS

| | | | | |
|---|---|---|---|---|
| 2017/0068368 | A1* | 3/2017 | Hsiao | G06F 3/0445 |
| 2017/0090637 | A1* | 3/2017 | Yoon | G06F 3/0446 |
| 2017/0308218 | A1* | 10/2017 | Ding | G06F 3/04166 |
| 2018/0046295 | A1* | 2/2018 | Weng | G02F 1/133514 |
| 2020/0371626 | A1* | 11/2020 | Mugiraneza | G02F 1/13338 |

FOREIGN PATENT DOCUMENTS

| | | |
|---|---|---|
| CN | 104756054 | 7/2015 |
| CN | 106502444 | 3/2017 |

OTHER PUBLICATIONS

Office Action of China Counterpart Application, dated May 13, 2022, pp. 1-8.

* cited by examiner

*Primary Examiner* — Temesghen Ghebretinsae
*Assistant Examiner* — Ivelisse Martinez Quiles
(74) *Attorney, Agent, or Firm* — JCIPRNET (57) ABSTRACT

The disclosure discloses a driving method of a touch electronic device. The driving method includes the following steps. A panel including a first substrate, a second substrate, a first sensing electrode, and a second sensing electrode is provided. The first sensing electrode is disposed on the first substrate, and the second sensing electrode is disposed on the second substrate and is located between the second substrate and the first sensing electrode. A touch sensing mode is performed in a frame period, and execution of the touch sensing mode includes performing identical driving on the first sensing electrode and the second sensing electrode.

17 Claims, 12 Drawing Sheets

# DRIVING METHOD OF TOUCH ELECTRONIC DEVICE

CROSS-REFERENCE TO RELATED APPLICATION

This application claims the priority benefit of China application serial no. 201911199468.7, filed on Nov. 29, 2019. The entirety of the above-mentioned patent application is hereby incorporated by reference herein and made a part of this specification.

BACKGROUND

Technical Field

The disclosure relates to a touch electronic device, and particularly to a driving method of a touch electronic device.

Description of Related Art

Touch electronic devices have been widely used in various aspects of life, such as smartphones, tablet computers, notebook computers, and in-vehicle panels. The touch electronic device may have touch sensing and/or force sensing function. However, in conventional touch electronic devices, it may be difficult to distinguish between a touch sensing signal and a force sensing signal, which affects the precision of sensing. Therefore, how to improve the above issue has become a topic in the industry.

SUMMARY

The disclosure provides a driving method of a touch electronic device including the following steps. A panel is provided. The panel includes a first substrate, a second substrate, a first sensing electrode and a second sensing electrode. The first sensing electrode is disposed on the first substrate, and the second sensing electrode is disposed on the second substrate and is located between the second substrate and the first sensing electrode. A touch sensing mode is executed in a frame period, and execution of the touch sensing mode includes performing identical driving on the first sensing electrode and the second sensing electrode.

The disclosure provides a driving method of a touch electronic device including the following steps. A panel is provided. The panel includes a first substrate, a second substrate, a first sensing electrode and a second sensing electrode. The first sensing electrode is disposed on the first substrate, and the second sensing electrode is disposed on the second substrate and is located between the second substrate and the first sensing electrode. A touch sensing mode and a force sensing mode are executed, and the touch sensing mode and the force sensing mode are respectively executed in different frame periods.

To make the aforementioned more comprehensible, several embodiments accompanied with drawings are described in detail as follows.

DESCRIPTION OF THE EMBODIMENTS

In the following description, some embodiments of the disclosure will be described with reference to the drawings. In fact, these embodiments may have many different variations, and the disclosure is not limited to the embodiments herein. The same reference numerals in the drawings are used to indicate the same or similar components.

The disclosure may be understood by referring to the following detailed description with reference to the accompanying drawings. It is noted that for comprehension of the reader and simplicity of the drawings, in the drawings of the disclosure, only a part of the electronic device is shown, and specific components in the drawings are not necessarily drawn to scale. Moreover, the quantity and the size of each component in the drawings are only schematic and are not intended to limit the scope of the disclosure.

Throughout the specification and the appended claims of the disclosure, certain terms are used to refer to specific components. Those skilled in the art should understand that electronic device manufacturers may probably use different names to refer to the same components. This specification is not intended to distinguish between components that have the same function but different names. In the following specification and claims, the terms "including", "containing", "having", etc., are open-ended terms, so they should be interpreted to mean "including but not limited to . . . ". Therefore, when the terms "including", "containing", and/or "having" are used in the description of the disclosure, they specify existence of corresponding features, regions, steps, operations, and/or components, but do not exclude existence of one or more corresponding features, regions, steps, operations, and/or components.

Directional terminology mentioned in the specification, such as "top", "bottom", "front", "back", "left", "right", etc., is used with reference to the orientation of the drawings being described. Therefore, the used directional terminology is only intended to illustrate, rather than limit, the disclosure. The drawings illustrate general characteristics of methods, structures, and/or materials used in specific embodiments. However, these drawings should not be construed as defining or limiting the scope or nature covered by these embodiments. For example, for clarity, a relative size, a thickness, and a location of each film layer, region, and/or structure may be reduced or enlarged.

When a corresponding component (e.g., a film layer or a region) is described as being "on another component", the component may be directly located on the another component, or other components may be present therebetween. On the other hand, when a component is described as being "directly on another component", no other component is present therebetween. Moreover, when a component is described as being "on another component", the two components have an up-down relationship in a top view, so the component may be above or below the another component, and the up-down relationship depends on the orientation of the device.

It should be understood that when a component or a film layer is described as being "connected to" another component or film layer, it may be directly connected to the another component or film layer, or there is an intervening component or film layer therebetween. When a component is described as being "directly connected" to another component or film layer, there is no intervening component or film layer therebetween. Moreover, when a component is described as being "coupled to another component (or a variant thereof)", the component may be directly connected to the another component, or indirectly connected (e.g., electrically connected) to the another component via one or more components.

The terms such as "about", "equal", "same", "substantially", or "approximately" are generally interpreted as being within a range of plus or minus 20% of a given value or range, or as being within a range of plus or minus 10%, plus or minus 5%, plus or minus 3%, plus or minus 2%, plus or minus 1%, or plus or minus 0.5% of the given value or range.

The ordinal numbers used in the specification and claims, such as "first", "second", etc., are used to modify components and do not imply and mean that the component/components are preceded by any ordinal numbers, and do not represent a sequence of one component with another, or a sequence in a manufacturing method. The use of these ordinal numbers is only intended to clearly distinguish between a component with a certain name and another component with the same name. It is possible that different terms are used in the claims and the specification, and accordingly, a first component in the specification may be a second component in the claims.

In the disclosure, a touch electronic device may include a touch device, a display device, an antenna device, a light-emitting device, a splicing device, other suitable electronic devices, or a combination of the above devices, but is not limited thereto.

In the disclosure, the touch electronic device may include an organic light-emitting diode (OLED) or an inorganic light-emitting diode (LED), e.g., a micro-LED/mini-LED, a quantum dot (QD) material, a quantum dot light-emitting diode (QLED/QDLED), a fluorescence material, a phosphor material, other suitable materials or a combination of the above, but it is not limited thereto.

Figure 1:
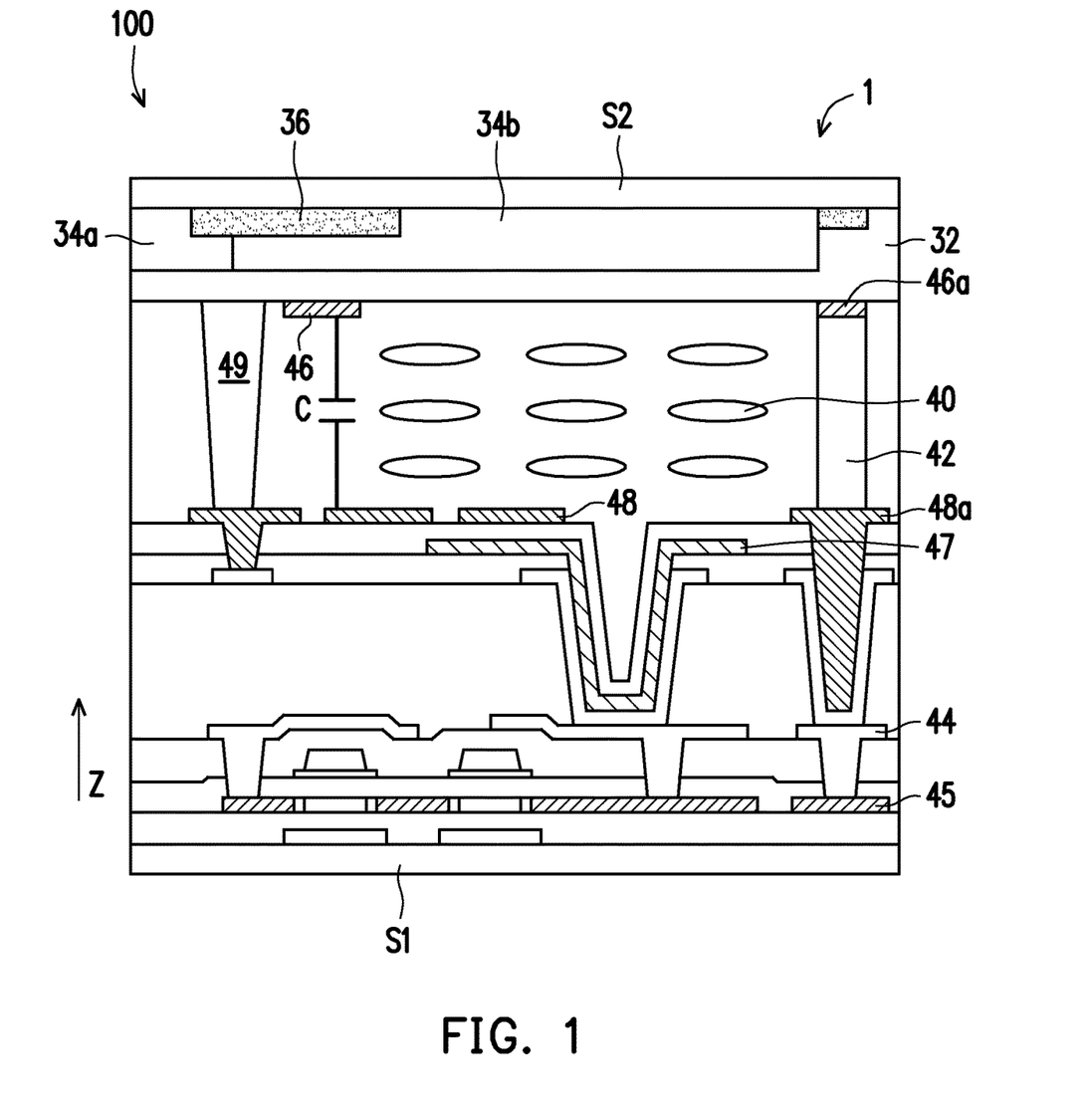
FIG. 1 is a schematic cross-sectional structural view showing a touch electronic device according to an embodiment of the disclosure.

FIG. 1 is a schematic cross-sectional structural view showing a touch electronic device according to an embodiment of the disclosure. Referring to FIG. 1, a touch electronic device 100 may have a panel 1, the panel 1 may have a display function and/or a touch function, but it is not limited thereto. In other words, the touch electronic device 100 may include the panel 1 which integrates a display function and a touch function, but is not limited thereto. In some embodiments, the touch electronic device 100 may include a first substrate S1, a second substrate S2 disposed opposite to the first substrate S1, a first sensing electrode 48 and a second sensing electrode 46. The first sensing electrode 48 is disposed on the first substrate S1, and the second sensing electrode 46 is disposed on the second substrate S2 and located between the second substrate S2 and the first sensing electrode 48, but the disclosure is not limited thereto. In some embodiments, the first sensing electrode 48 and the second sensing electrode 46 are disposed between the first substrate S1 and the second substrate S2. In some embodiments, the material of the first substrate S1 and/or the second substrate S2 may include glass, quartz, ceramic, sapphire, polyimide (PI), polyethylene terephthalate (PET), other suitable materials or a combination of the above materials, but is not limited thereto.

In some embodiments, a medium layer 40 is disposed between the first substrate S1 and the second substrate S2, and the medium layer 40 includes a liquid crystal, but is not limited thereto. In some embodiments, the medium layer 40 includes other suitable light modulation medium layers, but is not limited thereto. In some embodiments, the medium layer 40 is disposed between the first sensing electrode 48 and the second sensing electrode 46. In some embodiments, the touch electronic device 100 includes a black matrix 36, a color filter (e.g., a color filter 34a and/or 34b) and an overcoat 32. The black matrix 36, the color filter (e.g., the color filter 34a and/or 34b), and/or the overcoat 32 are disposed on the second substrate S2, but is not limited thereto. In some embodiments, the overcoat 32 is disposed between the second sensing electrode 46 and the second substrate S2, and the black matrix 36 and the color filter (e.g., the color filter 34a and/or 34b) are disposed between the overcoat 32 and the second substrate S2, but it is not limited thereto. In some embodiments, when the material of the second sensing electrode 46 includes metal, the black matrix 36 may overlap with the second sensing electrode 46 in a normal direction Z of the first substrate S1 to reduce the influence on display resulting from the reflection of external light by the second sensing electrode 46, but it is not limited thereto. In some embodiments, a spacer 49 is disposed between the first substrate S1 and the second substrate S2. In some embodiments, the spacer 49 is disposed between the overcoat 32 and the first sensing electrode 48 in the normal direction Z of the first substrate S1, but is not limited thereto. In some embodiments, the spacer 49 overlaps with the black matrix 36 in the normal direction Z of the first substrate S1.

Referring to FIG. 1, in some embodiments, at least a portion of the first sensing electrode 48 may overlap with the second sensing electrode 46 in the normal direction Z of the first substrate S1, but is not limited thereto. In some embodiments, a capacitance may be formed between the first sensing electrode 48 and the second sensing electrode 46. In some embodiments, a touch position or a touch force may be sensed according to a change in the capacitance value between the first sensing electrode 48 and the second sensing electrode 46. In some embodiments, the materials of the first sensing electrode 48 and the second sensing electrode 46 may respectively include a transparent conductive material such as indium tin oxide (ITO), indium zinc oxide (IZO), etc., a metal conductive material or a combination of the above, but are not limited thereto. In some embodiments, the materials of the first sensing electrode 48 and the second sensing electrode 46 may be the same or different.

Referring to FIG. 1, in some embodiments, a voltage may be supplied or transmitted to an electrode pad 45 by an external voltage source (not shown), and the voltage passes through a conductive layer 44, a conductive layer 48a (e.g., in the same layer as the first sensing electrode), a conductive connection layer 42 and/or a conductive layer 46a (e.g., in the same layer as the second sensing electrode) to be transmitted to the second sensing electrode 46, but the disclosure is not limited thereto. In some embodiments (not shown), a voltage may be supplied or transmitted to a conductive pad (not labeled; provided on the second substrate S2) by an external voltage source (not shown) and transmitted to the second sensing electrode 46 via the conductive layer 46a, but the disclosure is not limited thereto.

Figure 2:
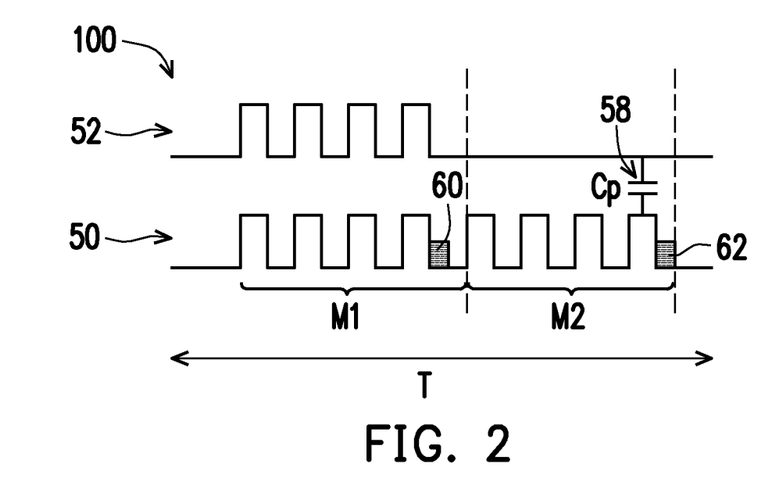
FIG. 2 is a schematic view showing operating voltages of a first sensing electrode and a second sensing electrode according to an embodiment of the disclosure.

FIG. 2 is a schematic view showing operating voltages of the first sensing electrode 48 and the second sensing electrode 46 according to an embodiment of the disclosure. Referring to FIG. 2, in a frame period T, a touch sensing mode M1 (e.g., a two-dimensional sensing mode) and/or a force sensing mode M2 (e.g., a three-dimensional sensing mode) is executed, but the disclosure is not limited thereto. It is noted that FIG. 2 only shows the example of one frame period T, in which an operating voltage 52 is a voltage applied to the second sensing electrode, and an operating voltage 50 is a voltage applied to the first sensing electrode. In some embodiments, the touch sensing mode M1 includes performing identical driving on the first sensing electrode 48 and the second sensing electrode 46. It is noted that the above "identical driving" means that a pulse voltage applied to the first sensing electrode 48 and a pulse voltage applied to the second sensing electrode 46 at the same time point are the same. For example, the same pulse voltage has the same pulse waveform, including the height and the width of the waveform and the magnitude of the pulse voltage. In other words, in the touch sensing mode M1, there may be no capacitance between the first sensing electrode 48 and the second sensing electrode 46. In addition, in some embodiments, the touch sensing mode M1 and the force sensing mode M2 are executed separately, and the force sensing mode M2 includes applying a pulse voltage to the first sensing electrode 48 and applying a fixed voltage to the second sensing electrode 46. The above "fixed voltage" means that the voltage remains fixed, it does not have any pulse voltage or a voltage of another waveform. For example, the fixed voltage includes a ground voltage, a common voltage, or other suitable fixed voltages, but is not limited thereto. In other words, in the force sensing mode M2, a capacitance 58 may be present and be sensed between the first sensing electrode 48 and the second sensing electrode 46, and the capacitance 58 may have a capacitance value Cp. It is noted that FIG. 2 shows the capacitance change of the first sensing electrode 48 and the second sensing electrode 46 in different modes, e.g., the touch sensing mode M1 and the force sensing mode M2. The capacitances in FIG. 2 are capacitances of the case where a touch object does not touch the surface of the panel of the touch electronic device. The touch object includes a finger, a touch stylus, a touch glove and/or other suitable touch objects. In some embodiments, the driving method of the touch electronic device comprises performing a first reading step and/or a second reading step 62 in the frame period. The first reading step 60 comprises outputting a sensing data obtained in the touch sensing mode M1, the second reading step 62 comprises outputting a sensing data obtained in the force sensing mode M2. In some embodiments, in a frame period T, the sequence of the touch sensing mode M1 and the force sensing mode M2 may be reversed or adjusted according to the requirements.

Figure 3:
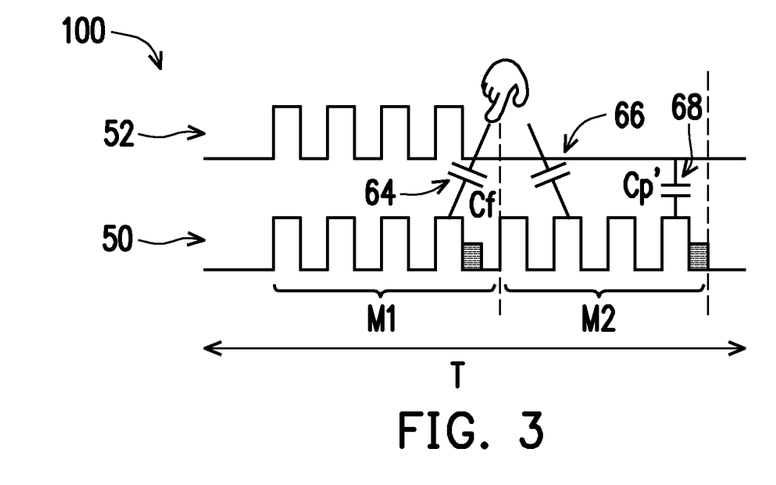
FIG. 3 is a schematic view showing operating voltages of the first sensing electrode and the second sensing electrode according to an embodiment of the disclosure.

FIG. 3 is a schematic view showing operating voltages of the first sensing electrode and the second sensing electrode according to an embodiment of the disclosure. Referring to FIG. 3, the main difference between FIG. 3 and FIG. 2 in the capacitances of the first sensing electrode 48 and the second sensing electrode 46 shown in FIG. 3 in different modes. The capacitances in FIG. 3 are capacitances of the case where a touch object as mentioned above touches the panel 1 of the touch electronic device 100. As shown in FIG. 3, when the touch object touches or applies a force to the touch electronic device 100 (e.g., the second substrate S2), in the touch sensing mode M1, a sensing capacitance 64 is present between the first sensing electrode 48 and the touch object, and the capacitance value of the sensing capacitance 64 is Cf. The execution of the force sensing mode M2 includes sensing a capacitance change between the first sensing electrode 48 and the second sensing electrode 46. Specifically, in the force sensing mode M2, in addition to a sensing capacitance 66 (which is substantially equal to the sensing capacitance 64) between the first sensing electrode 48 and the touch object, a capacitance 68 may be present between the first sensing electrode 48 and the second sensing electrode 46. For example, the capacitance 68 has a capacitance value Cp', and a capacitance value difference between the capacitance value Cp' and the capacitance value Cp as shown in FIG. 2 is ΔCp. Specifically, when the touch object applies a force to the touch electronic device 100 (e.g., the second substrate S2), the capacitance value of the capacitance between the first sensing electrode 48 and the second sensing electrode 46 changes from the capacitance case value Cp to the capacitance value Cp', and the capacitance change amount ΔCp may be a capacitance change amount resulting from the press by the touch object: Cp'=Cp+ΔCp.

Referring to FIG. 2 and FIG. 3, in FIG. 2, in the force sensing mode M2, the capacitance value Cp of the capacitance 58 between the first sensing electrode 48 and the second sensing electrode 46 may be sensed. In FIG. 3, in the touch sensing mode M1, the capacitance value Cf of the sensing capacitance 64 may be sensed. In addition, as shown in FIG. 3, in the force sensing mode M2, the sensing capacitance 66 may be sensed, and the sensing capacitance 66 may substantially have a capacitance total C1(M2) of the capacitance value Cf and the capacitance 68 (which has the capacitance value Cp'). Moreover, through analysis performed by a processing circuit (not labeled), the capacitance change amount ΔCp may be obtained by subtracting the capacitance value Cp and the capacitance value Cf from the capacitance total C1(M2) (ΔCp=C1(M2)−Cp−Cf). Through the operations shown in FIG. 2 and FIG. 3, the capacitance values sensed in different modes (e.g., the touch sensing mode M1 and the force sensing mode M2) may be distinguished, and the capacitance value Cf and the capacitance change amount ΔCp may be obtained to improve the precision of sensing. Based on the capacitance change amount ΔCp, the magnitude of the force applied by the touch object is determined, and corresponding operations may be performed according to the magnitude of the force. For example, when the force is a light press, camera focusing may be performed. When the force is a hard press, the shooting function may be performed. Further, when a continuous press is performed, continuous shooting may be performed. However, the disclosure is not limited thereto. In addition, when the touch sensing mode M1 is executed, the position at which the touch object slides or touches may be determined based on the position of the sensed capacitance 64, but the disclosure is not limited thereto.

Figure 4:
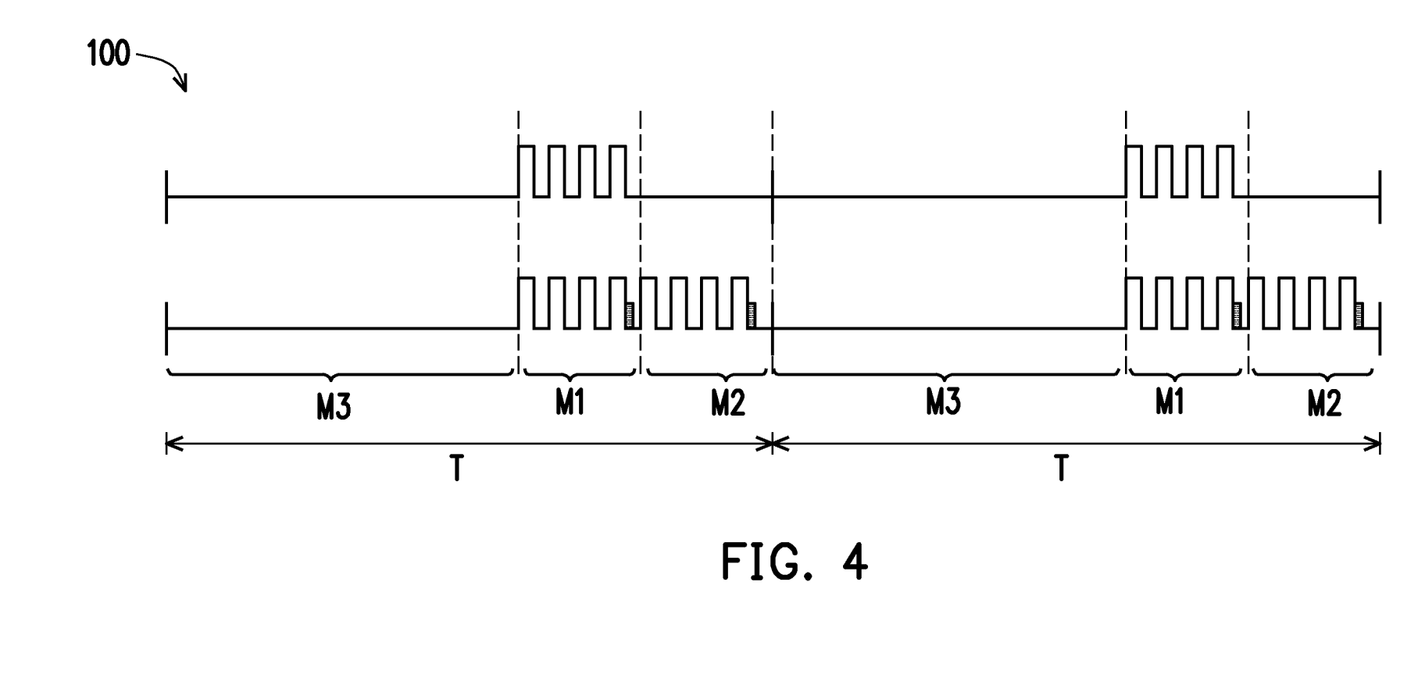
FIG. 4 is a schematic view showing operating voltages of the first sensing electrode and the second sensing electrode in two frame periods according to an embodiment of the disclosure.

FIG. 4 is a schematic view showing operating voltages of the first sensing electrode and the second sensing electrode in two frame periods according to an embodiment of the disclosure. Referring to FIG. 4, for example, two frame periods T are shown, but the disclosure is not limited thereto. In some embodiments, the duration of one frame period may be 16.6 ms, for example, but is not limited thereto. In other embodiments, the duration of one frame period may be adjusted according to the requirements. In some embodiments, in one frame period T, a display mode M3 for displaying images may further be executed, in addition to the touch sensing mode M1 and the force sensing mode M2, but the disclosure is not limited thereto. In some embodiments, the display mode M3 is executed first in a frame period T. In the execution of the display mode M3, a fixed voltage is applied to the first sensing electrode 48, and a fixed voltage is applied to the second sensing electrode 46, but the disclosure is not limited thereto. Subsequently, the touch sensing mode M1 and the force sensing mode M2 may be sequentially executed, but the disclosure is not limited thereto. In other words, the display mode M3, the touch sensing mode M1, and the force sensing mode M2 are executed separately. The voltage operations applied to the first sensing electrode 48 and/or the second sensing electrode 46 in the touch sensing mode M1 and the force sensing mode M2 have been described above and will not be repeatedly described herein.

Figure 5:
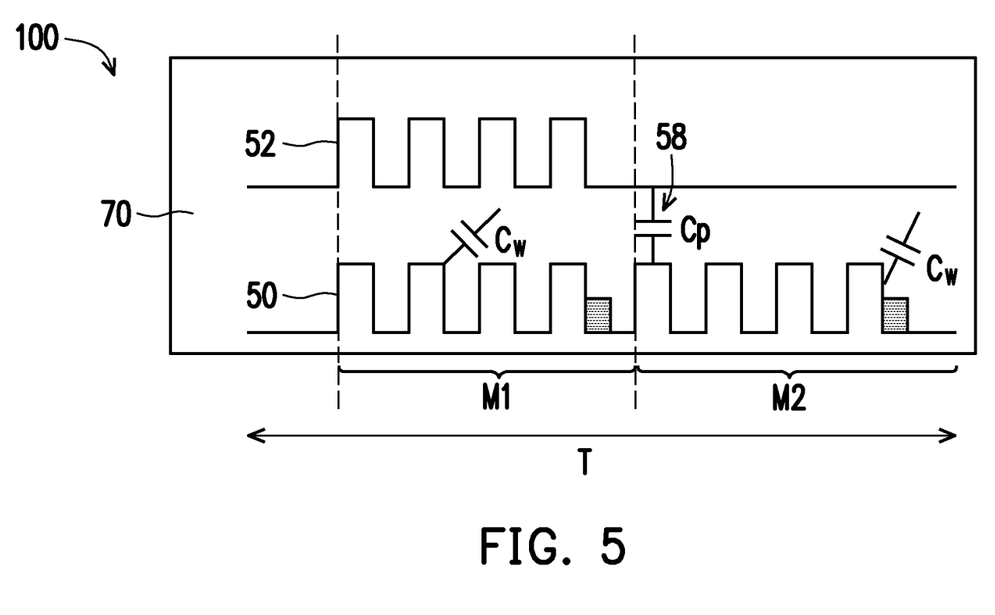
FIG. 5 is a schematic view showing operating voltages of the first sensing electrode and the second sensing electrode in a water environment according to an embodiment of the disclosure.

FIG. 5 is a schematic view showing operating voltages of the first sensing electrode and the second sensing electrode in a water environment according to an embodiment of the disclosure. Referring to FIG. 5, the touch electronic device 100 may be operated in a water environment, but is not limited thereto. According to the requirements, the touch electronic device 100 may be placed in any other environment such as an environment with an interfering object. It is noted that the operation of the touch electronic device 100 of FIG. 5 is similar to that of FIG. 2. For example, in a frame period T, the touch sensing mode M1 and the force sensing mode M2 are executed. Similarly, the capacitances of the first sensing electrode 48 and the second sensing electrode 46 shown in FIG. 5 in different modes (e.g., the touch sensing mode M1 and the force sensing mode M2) are capacitances of the case where a touch object as mentioned above does not touch the panel of the touch electronic device 100. Specifically, in a water environment 70, when the touch object does not touch the touch electronic device 100, in the touch sensing mode M1, a noise capacitance value Cw generated due to the presence in water may be sensed. In addition, in the force sensing mode M2, a capacitance total C(M2) of a capacitance 58 (which has a capacitance value Cp) between the first sensing electrode 48 and the second sensing electrode 46 and the above noise capacitance value Cw may be sensed, but is not limited thereto.

Figure 6:
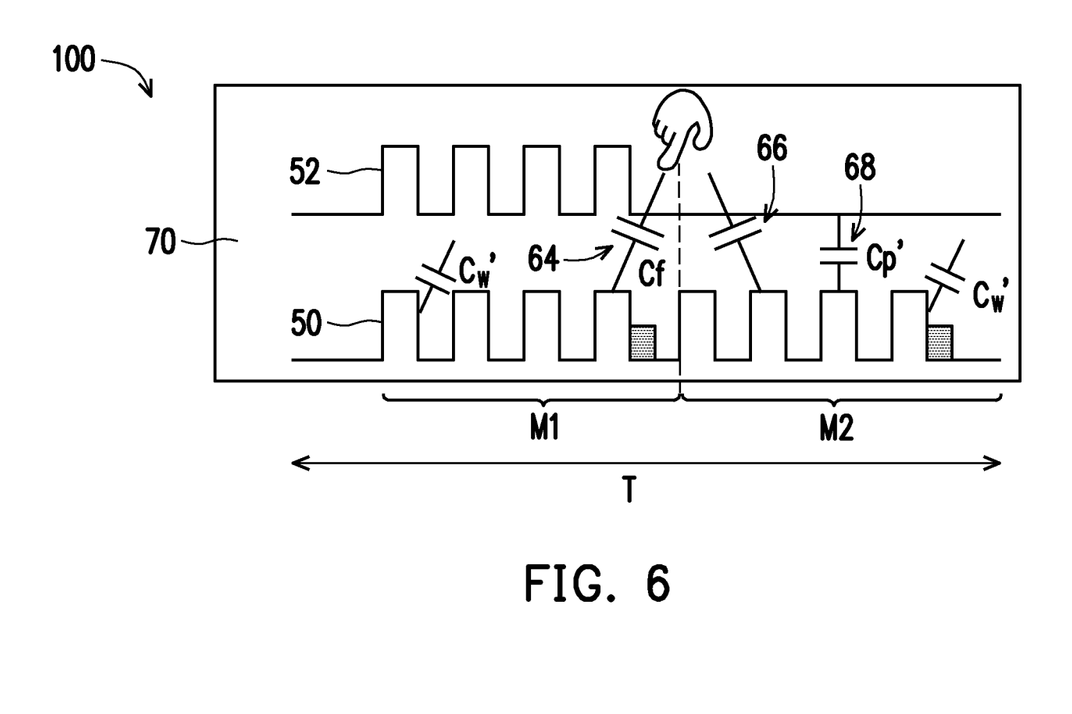
FIG. 6 is a schematic view showing operating voltages of the first sensing electrode and the second sensing electrode in a water environment according to an embodiment of the disclosure.

FIG. 6 is a schematic view showing operating voltages of the first sensing electrode and the second sensing electrode in a water environment according to an embodiment of the disclosure. Referring to FIG. 6, the main difference between FIG. 6 and FIG. 5 lies in the capacitances of the first sensing electrode 48 and the second sensing electrode 46 shown in FIG. 6 in the different modes (as described above), and the capacitances are capacitances of the case where the touch object touches the panel 1 of the touch electronic device 100. As shown in FIG. 6, when the touch object touches and/or applies a force to the touch electronic device 100 (e.g., the second substrate S2), a sensing capacitance is present between the first sensing electrode 48 and the touch object (e.g., a finger), and the capacitance value of the sensing capacitance is Cf. Specifically, as shown in FIG. 6, in the touch sensing mode M1, a capacitance total C(M1) of a noise capacitance value Cw' generated due to the touch by the touch object in water (Cw=Cw'+ΔCw) and a sensing capacitance 64 (which has a capacitance value Cf) may be sensed. In the force sensing mode M2, a sensing capacitance 66 (which is substantially equal to the sensing capacitance 64) present between the first sensing electrode 48 and the touch object and the above noise capacitance value Cw' may be sensed, and a capacitance 68 between the first sensing electrode 48 and the second sensing electrode 46 may also be sensed. For example, the capacitance 68 has a capacitance value Cp', and the difference between the capacitance value Cp' and the capacitance value Cp (e.g., the capacitance value in FIG. 5) is expressed by ΔCp. Specifically, when the touch object applies a force to the touch electronic device 100 (e.g., the second substrate S2), the capacitance between the first sensing electrode 48 and the second sensing electrode 46 changes from the capacitance value Cp to the capacitance value Cp', and the capacitance change amount is expressed by ΔCp, the capacitance change amount resulting from the press by the touch object: Cp'=Cp+ΔCp.

Referring to FIG. 5 and FIG. 6, in FIG. 5, in the touch sensing mode M1, the noise capacitance value Cw may be sensed, and in the force sensing mode M2, and the capacitance total C(M2) of the noise capacitance value Cw and the capacitance 58 (which has the capacitance value Cp) between the first sensing electrode 48 and the second sensing electrode 46 may be sensed. Through analysis performed by the processing circuit, the noise capacitance value Cw may be subtracted from the capacitance total C(M2) to obtain the capacitance 58 (which has the capacitance value Cp) between the first sensing electrode 48 and the second sensing electrode 46. In addition, in FIG. 6, in the touch sensing mode M1, the capacitance total C2(M1) of the sensing capacitance 64 (which has the capacitance value Cf) and the noise capacitance value Cw' may be sensed, in the force sensing mode M2, the capacitance total C2(M2) of the sensing capacitance 66 (which has the capacitance value Cf), the capacitance 68 (which has the capacitance value Cp') and the noise capacitance value Cw' may be sensed. For example, through analysis performed by the processing circuit, the capacitance value Cp, the capacitance value Cf, and the noise capacitance value Cw' may be subtracted from the capacitance total C2(M2) to obtain the capacitance change amount ΔCp. Based on the capacitance change amount ΔCp, the magnitude of the force applied by the touch object is determined, and the corresponding operations may be performed according to the magnitude of the force. For example, when the force is a light press, camera focusing may be performed. When the force is a hard press, the shooting function may be performed. Further, when a continuous hard press is performed, continuous shooting may be performed. However, the disclosure is not limited thereto. In addition, when the touch sensing mode M1 is executed, the position at which the touch object slides and/or touches may be determined based on the position of the sensed capacitance 64, but the disclosure is not limited thereto.

In the description of FIG. 2 to FIG. 3 and FIG. 5 to FIG. 6 above, as an example, the touch sensing mode M1 and the force sensing mode M2 are executed in a frame period T, and the force sensing mode M2 is executed after the touch sensing mode M1. However, the disclosure is not limited thereto, and several other possible operations will be described below. In above operation, identical driving is performed on the first sensing electrode 48 and the second sensing electrode 46 in the touch sensing mode M1, and different voltages are respectively applied to the first sensing electrode 48 and the second sensing electrode 46 in the force sensing mode M2. For example, in the force sensing mode M2, a fixed voltage is applied to one of the first sensing electrode 48 and the second sensing electrode 46, and a pulse voltage is applied to the other of the first sensing electrode 48 and the second sensing electrode 46. Accordingly, the capacitance values sensed in different modes (e.g., the touch sensing mode M1 and the force sensing mode M2) may be distinguished, and the capacitance value Cf and the capacitance change amount ΔCp may be obtained to improve the precision of sensing.

It is noted that, referring to FIG. 6, it may not be easy to distinguish between the noise capacitance value Cw' and the capacitance value Cf of the sensing capacitance 64 in the touch sensing mode M1, and only the capacitance total C(M1) of the two may be sensed. Moreover, if the noise capacitance value Cw' is larger than the capacitance value Cf of the sensing capacitance 64 (e.g., in some cases, the noise capacitance value Cw' is 10 times or more the capacitance value Cf), there is risk that the capacitance value Cf of the sensing capacitance 64 may be erroneously determined. Therefore, it may be difficult to recognize the touched region of the touch electronic device 100. However, in the force sensing mode M2, the capacitance change amount ΔCp may be obtained based on the above operation, and the region corresponding to the occurrence of the capacitance change amount ΔCp may also be obtained. Therefore, the touch position may be obtained to improve the above issue that the capacitance value Cf may be erroneously determined in the touch sensing mode M1.

Figure 7:
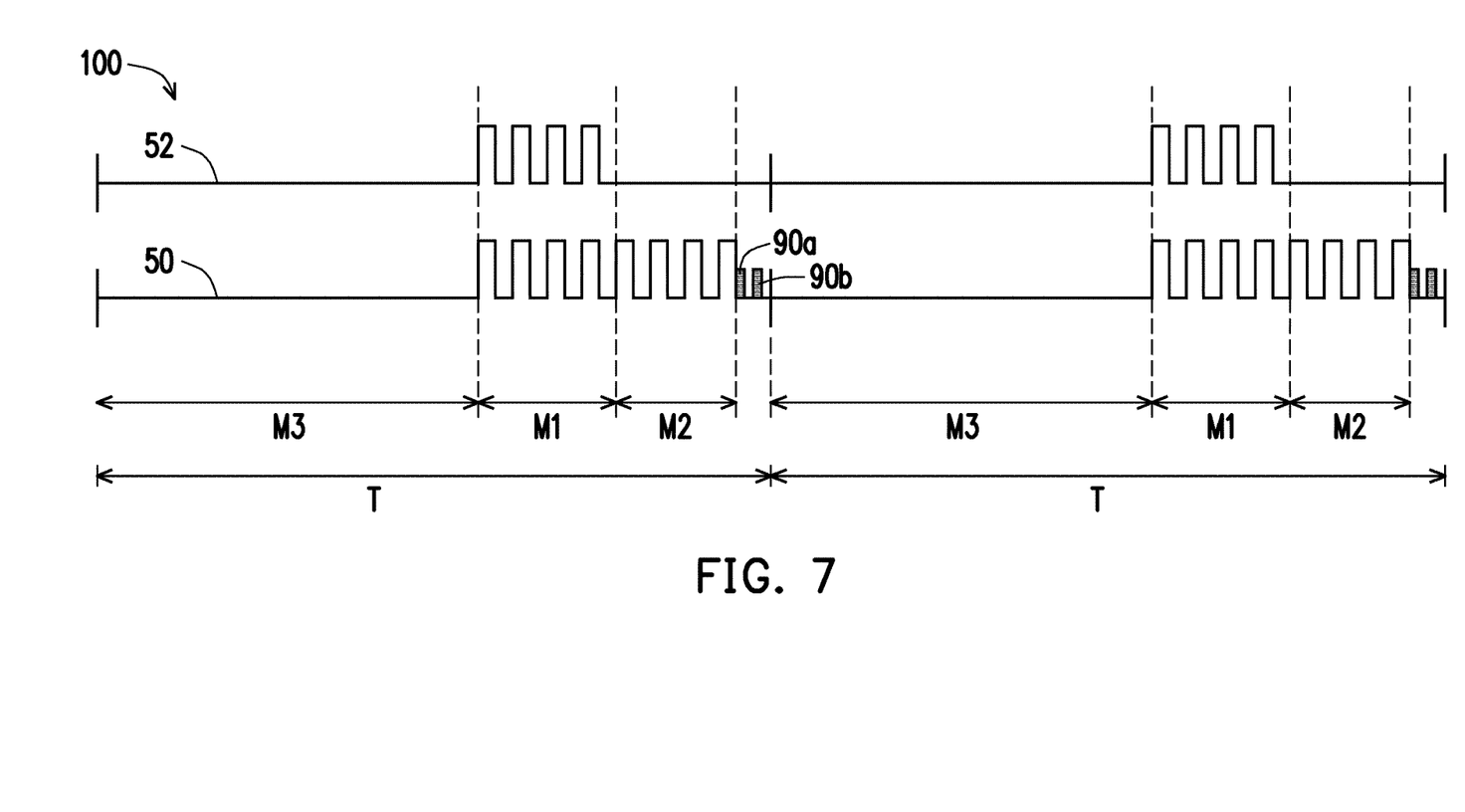
FIG. 7 is a schematic view showing operating voltages of the first sensing electrode and the second sensing electrode in two frame periods according to an embodiment of the disclosure.

FIG. 7 is a schematic view showing operating voltages of the first sensing electrode and the second sensing electrode in two frame periods according to an embodiment of the disclosure. Referring to FIG. 7, in a frame period, the display mode M3, the touch sensing mode M1, and the force sensing mode M2 may be executed. It is noted that the operation of FIG. 7 is similar to that of FIG. 4, and the difference lies in that a first reading step 90a and a second reading step 90b in the embodiment of FIG. 7 are sequentially executed after the touch sensing mode M1 and the force sensing mode M2 are executed, for example, but the disclosure is not limited thereto.

Figure 8:
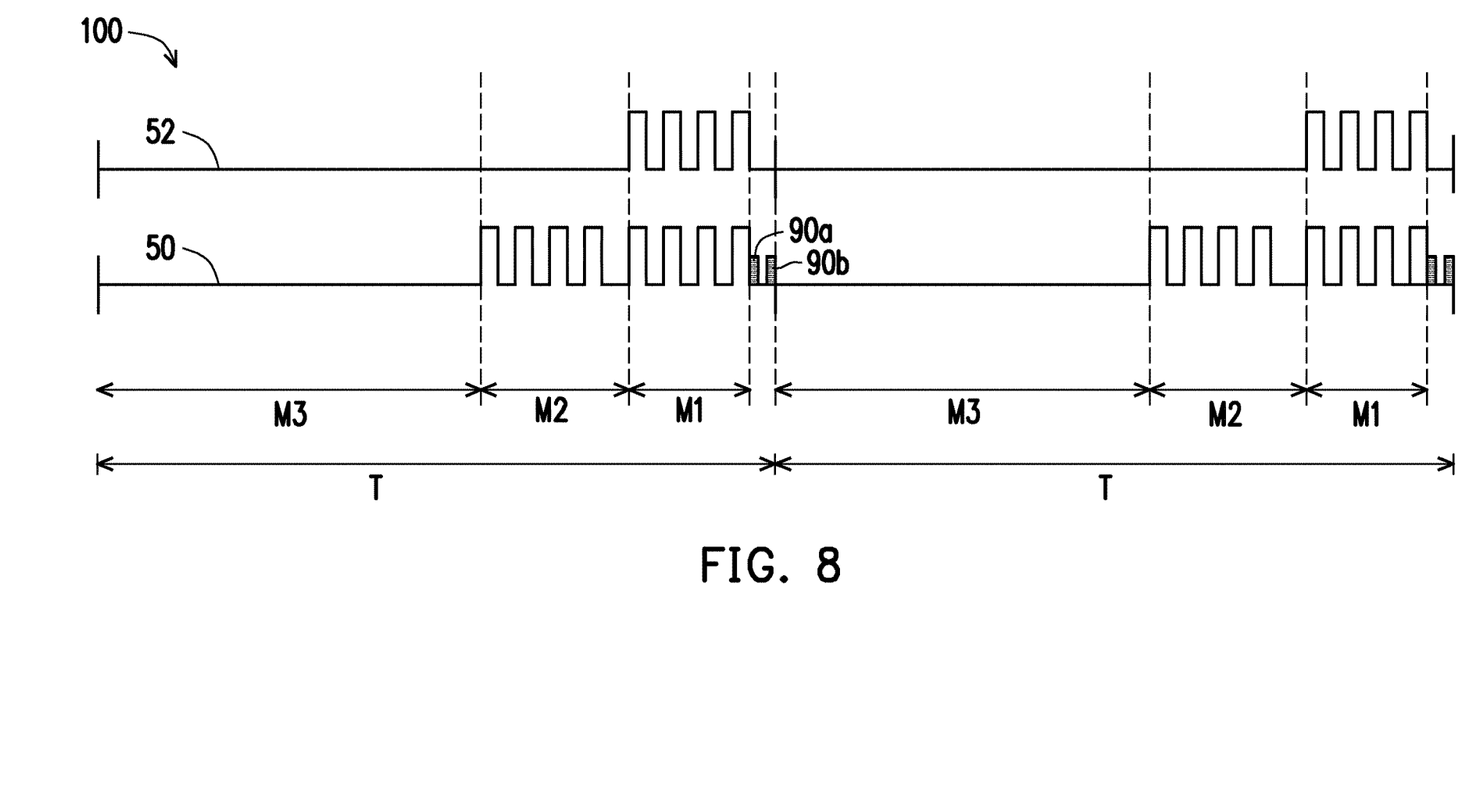
FIG. 8 is a schematic view showing operating voltages of the first sensing electrode and the second sensing electrode in two frame periods according to an embodiment of the disclosure.

FIG. 8 is a schematic view showing operating voltages of the first sensing electrode and the second sensing electrode in two frame periods according to an embodiment of the disclosure. Referring to FIG. 8, the operation of FIG. 8 is similar to that of FIG. 7, and the difference lies in that, in the embodiment of FIG. 8, in a frame period T, the execution sequence of the touch sensing mode M1 and the force sensing mode M2 is reversed.

Figure 9:
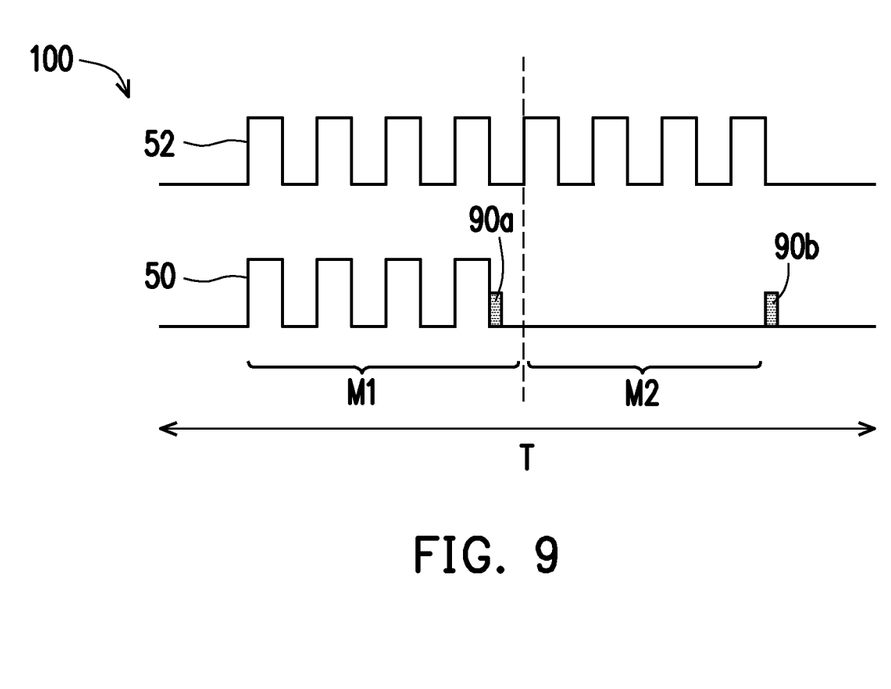
FIG. 9 is a schematic view showing operating voltages of the first sensing electrode and the second sensing electrode according to an embodiment of the disclosure.

FIG. 9 is a schematic view showing operating voltages of the first sensing electrode and the second sensing electrode according to an embodiment of the disclosure. Referring to FIG. 9, FIG. 9 is similar to FIG. 2, and the difference lies in that, in the force sensing mode M2 in the embodiment of FIG. 9, a fixed voltage is applied to the first sensing electrode 48, and a pulse voltage is applied to the second sensing electrode 46.

Figure 10:
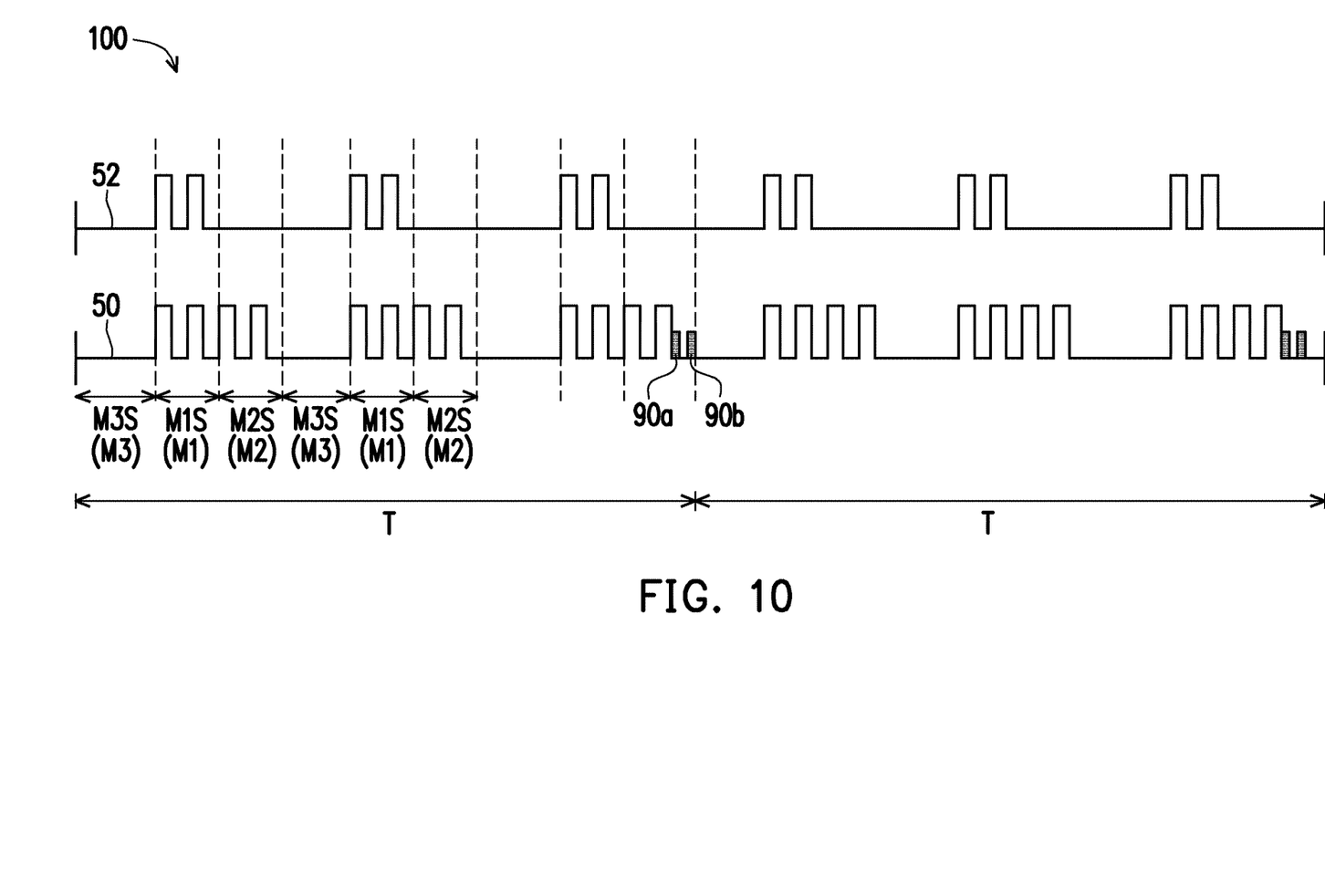
FIG. 10 is a schematic view showing operating voltages of the first sensing electrode and the second sensing electrode in two frame periods according to an embodiment of the disclosure.

FIG. 10 is a schematic view showing operating voltages of the first sensing electrode and the second sensing electrode in two frame periods according to an embodiment of the disclosure. Referring to FIG. 10, in a frame period T, the display mode M3 is divided into multiple display intervals M3S, and the multiple display intervals M3S are not continuous with respect to each other. In some embodiments (not shown), the duration of the multiple display intervals M3S may be the same or different. In some embodiments, in a frame period T the touch sensing mode M1 may be divided into multiple touch sensing intervals M1S, and the multiple touch sensing intervals M1S are not continuous with respect to each other. In some embodiments (not shown), the duration of the multiple touch sensing intervals M1S may be the same or different, for example. In some embodiments, in a frame period T, the force sensing mode M2 may be divided into multiple force sensing intervals M2S, and the multiple force sensing intervals M2S are not continuous with respect to each other. In some embodiments (not shown), the duration of the multiple force sensing intervals M2S may be the same or different, for example. Specifically, the discontinuity of the display intervals M3S means that intervals of other modes (e.g., the touch sensing interval M1S and/or the force sensing interval M2S) are inserted between adjacent display intervals M3S.

Figure 11:
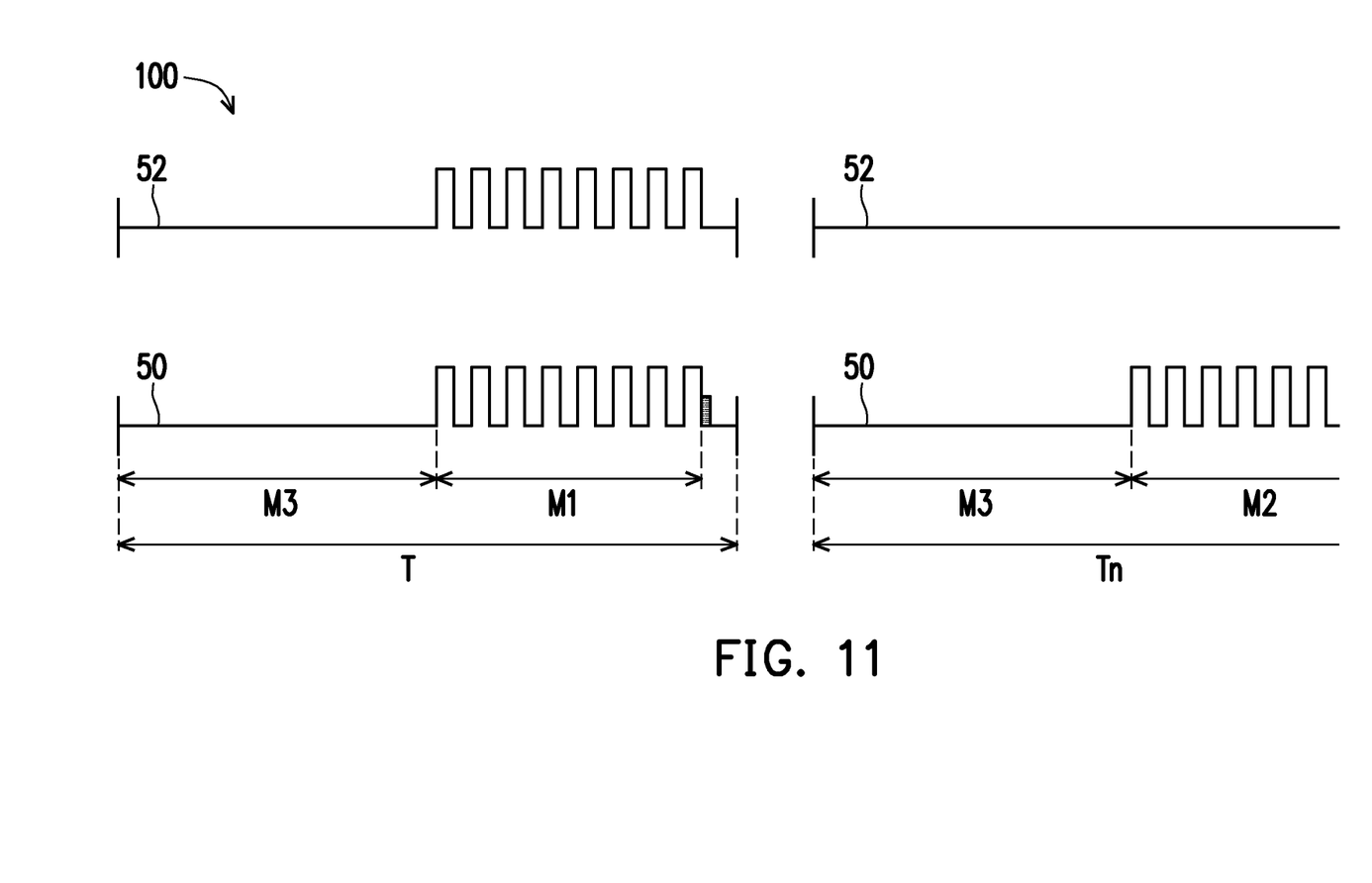
FIG. 11 is a schematic view showing operating voltages of the first sensing electrode and the second sensing electrode in n frame periods according to an embodiment of the disclosure.

FIG. 11 is a schematic view showing operating voltages of the first sensing electrode and the second sensing electrode in n frame periods according to an embodiment of the disclosure. In some embodiments, the touch electronic device may execute the touch sensing mode M1 and the force sensing mode M2, and the touch sensing mode M1 and the force sensing mode M2 are respectively executed in different frame periods. Referring to FIG. 11, in a frame period T, the touch sensing mode M1 and the display mode M3 are executed, and the touch sensing mode M1 includes performing identical driving on the first sensing electrode 48 and the second sensing electrode 46 as described above. In addition, in another frame period Tn (e.g., an $n^{th}$ frame period), the force sensing mode M2 and the display mode M3 are executed, and the execution of the force sensing mode M2 includes applying a pulse voltage to one of the first sensing electrode 48 and the second sensing electrode 46, and applying a fixed voltage to the other of the first sensing electrode 48 and the second sensing electrode 46. In other embodiments (not shown), in a frame period T, the force sensing mode M2 and the display mode M3 are executed, and in another frame period Tn, the touch sensing mode M1 and the display mode M3 are executed. In some embodiments (not shown), in the operation of the touch electronic device 100, a total time T1 of the touch sensing mode M1 may be the same as or different from a total time T2 of the force sensing mode M2. The total time T1 of the touch sensing mode M1 is a total time of executing all the touch sensing mode M1, the total time T2 of the force sensing mode M2 is a total time of executing all the force sensing mode M2.

Figure 12:
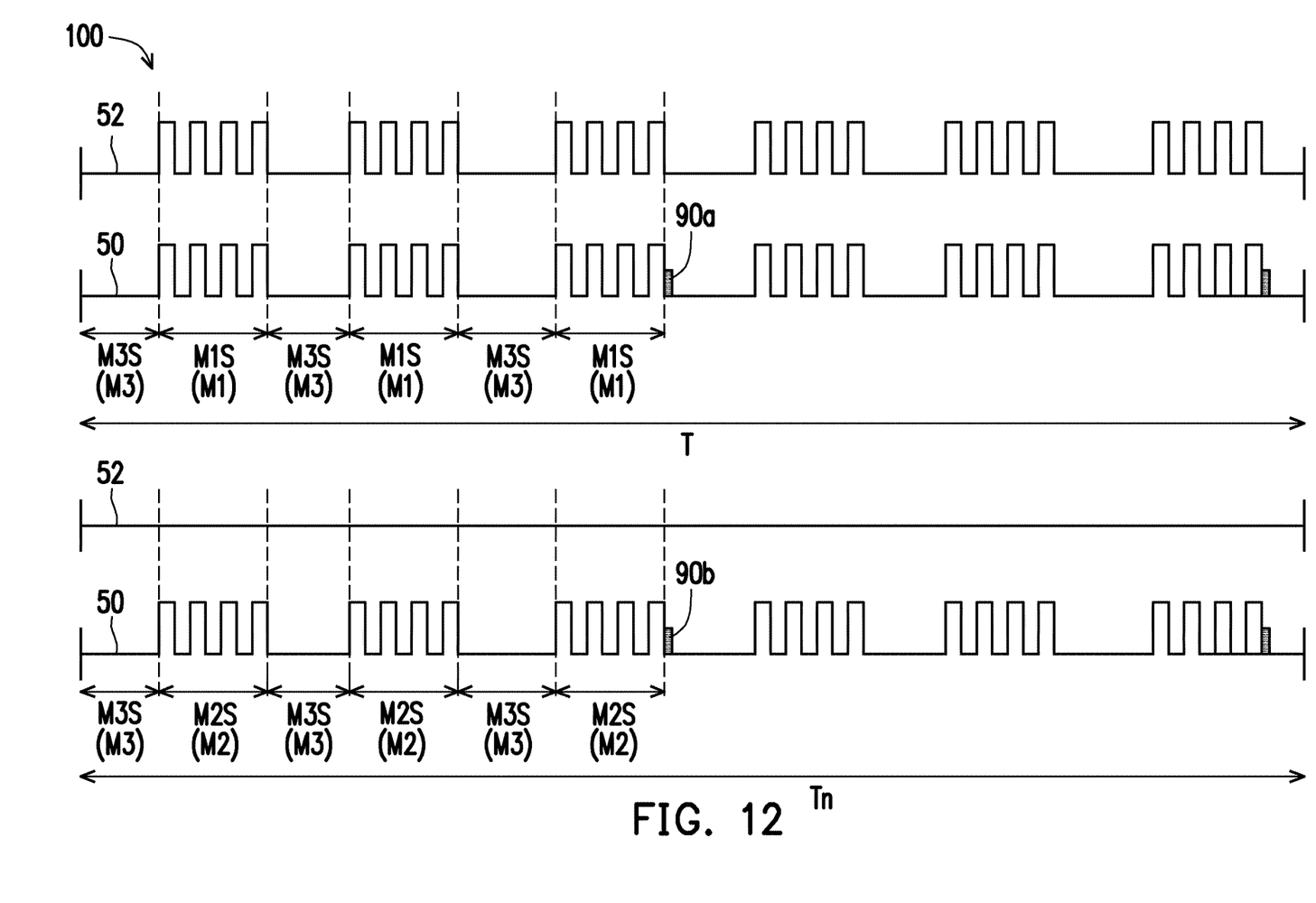
FIG. 12 is a schematic view showing operating voltages of the first sensing electrode and the second sensing electrode in n frame periods according to an embodiment of the disclosure.

FIG. 12 is a schematic view showing operating voltages of the first sensing electrode and the second sensing electrode in n frame periods according to an embodiment of the disclosure. Referring to FIG. 12 which is similar to FIG. 10 or FIG. 11, after appropriately combining FIG. 10 and FIG. 11, in a frame period T, the touch sensing mode M1 and the display mode M3 are executed, the touch sensing mode M1 is divided into multiple touch sensing mode intervals M1S, and the display mode M3 is divided into multiple display mode intervals M3S. In another frame period Tn (e.g., the $n^{th}$ period), the force sensing mode M2 and the display mode M3 are executed, the force sensing mode M2 is divided into multiple force sensing mode intervals M2S, and the display mode M3 is divided into multiple display mode intervals M3S, but the disclosure is not limited thereto.

Figure 13:
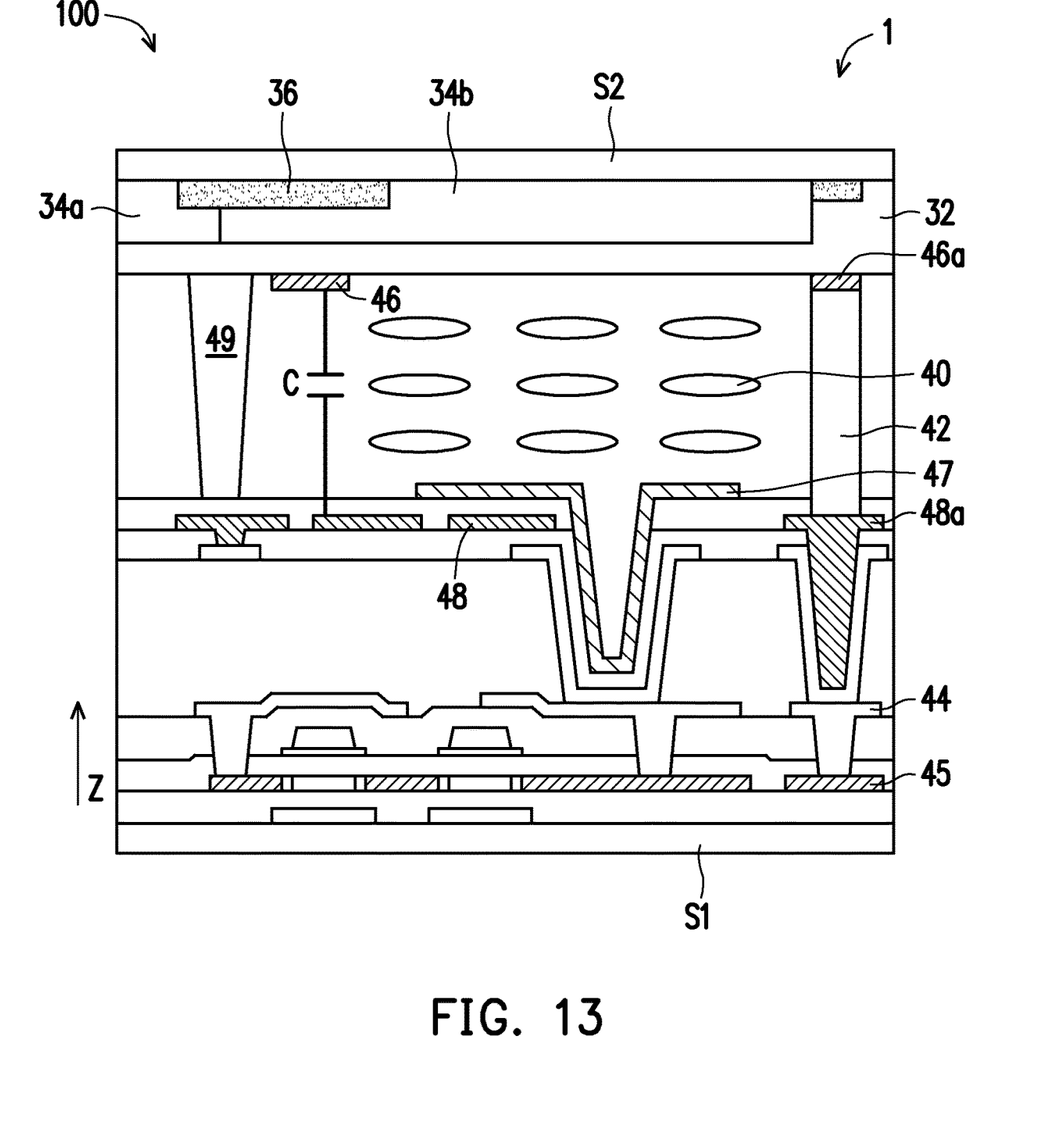
FIG. 13 is a schematic cross-sectional structural view showing a touch electronic device according to an embodiment of the disclosure.

FIG. 13 is a schematic cross-sectional structural view showing a touch electronic device according to an embodiment of the disclosure. Referring to FIG. 13, compared to FIG. 1, FIG. 13 shows a top pixel electrode design, a pixel electrode 47 is disposed in an upper layer relative to the common electrode (corresponding to the first sensing electrode 48), and the common electrode is used as the first sensing electrode 48. In contrast, FIG. 1 shows, a top common electrode design, the common electrode is disposed in an upper layer relative to the pixel electrode 47, and the common electrode is used as the first sensing electrode 48, but the disclosure is not limited thereto. Reference may be made to FIG. 1 above for descriptions of some layers of FIG. 13.

The disclosure provides a driving method of a touch electronic device. The multiple embodiments described above may be combined with each other to form other embodiments.

Although the embodiments of the disclosure have been disclosed as above, it should be understood that persons skilled in the art may make changes, replacements, and modifications without departing from the spirit and scope of the disclosure. In addition, the protection scope of the disclosure is not limited to the process, machine, manufacturing, material composition, device, method, and step in specific embodiments described in the specification. Persons skilled in the art may understand the current or to-be-developed process, machine, manufacturing, material composition, device, method, and step from the content of the disclosure, which may be used according to the disclosure as long as the substantially same functions or substantially same results as in the embodiments described herein may be obtained. Therefore, the protection scope of the disclosure includes the foregoing process, machine, manufacturing, material composition, device, method, and step. In addition, each claim constitutes an individual embodiment, and the protection scope of the disclosure also includes a combination of the claims and embodiments. The protection scope of the disclosure should be determined based on the scope defined in the appended claims.

What is claimed is:

1. A driving method of a touch electronic device, comprising:
    providing a panel comprising a first substrate, a second substrate, a first sensing electrode and a second sensing electrode, wherein the first sensing electrode is disposed on the first substrate, and the second sensing electrode is disposed on the second substrate and located between the second substrate and the first sensing electrode;
    executing a touch sensing mode in a frame period, wherein execution of the touch sensing mode comprises performing identical driving on the first sensing electrode and the second sensing electrode;
    executing a force sensing mode in the frame period, wherein the touch sensing mode and the force sensing mode are executed separately;
    performing a first reading step in the frame period, wherein the first reading step comprises outputting a sensing data obtained in the touch sensing mode; and
    performing a second reading step in the frame period, wherein the second reading step comprises outputting a sensing data obtained in the force sensing mode,
    wherein the first reading step and the second reading step are executed after the touch sensing mode and the force sensing mode are executed.

2. The driving method of the touch electronic device according to claim 1, wherein execution of the force sensing mode comprises sensing a capacitance change between the first sensing electrode and the second sensing electrode.

3. The driving method of the touch electronic device according to claim 1, further comprising executing a display mode in the frame period, wherein the display mode, the touch sensing mode, and the force sensing mode are executed separately.

4. The driving method of the touch electronic device according to claim 3, wherein a fixed voltage is applied to the first sensing electrode in the display mode, and a pulse voltage is applied to the first sensing electrode in the touch sensing mode.

5. The driving method of the touch electronic device according to claim 4, wherein in the force sensing mode, a fixed voltage is applied to the first sensing electrode, and a pulse voltage is applied to the second sensing electrode.

6. The driving method of the touch electronic device according to claim 4, wherein in the force sensing mode, a pulse voltage is applied to the first sensing electrode, and a fixed voltage is applied to the second sensing electrode.

7. The driving method of the touch electronic device according to claim 3, wherein in the frame period, the display mode is divided into multiple display intervals, and the multiple display intervals are not continuous with respect to each other.

8. The driving method of the touch electronic device according to claim 1, wherein in the frame period, the touch sensing mode is divided into multiple touch sensing intervals, and the multiple touch sensing intervals are not continuous with respect to each other.

9. The driving method of the touch electronic device according to claim 1, wherein in the frame period, the force sensing mode is divided into multiple force sensing intervals, and the multiple force sensing intervals are not continuous with respect to each other.

10. A driving method of a touch electronic device, comprising:
    providing a panel comprising a first substrate, a second substrate, a first sensing electrode and a second sensing electrode, wherein the first sensing electrode is disposed on the first substrate, and the second sensing electrode is disposed on the second substrate and is located between the second substrate and the first sensing electrode; and
    executing a touch sensing mode and a force sensing mode in a frame period, wherein the touch sensing mode and the force sensing mode are executed separately;
    performing a first reading step in the frame period, wherein the first reading step comprises outputting a sensing data obtained in the touch sensing mode; and
    performing a second reading step in the frame period, wherein the second reading step comprises outputting a sensing data obtained in the force sensing mode, wherein the first reading step and the second reading step are executed after the touch sensing mode and the force sensing mode are executed.

11. The driving method of the touch electronic device according to claim 10, wherein execution of the touch sensing mode includes performing identical driving on the first sensing electrode and the second sensing electrode.

12. The driving method of the touch electronic device according to claim 10, wherein a fixed voltage is applied to one of the first sensing electrode and the second sensing electrode, and a pulse voltage is applied to the other of the first sensing electrode and the second sensing electrode in the force sensing mode.

13. The driving method of the touch electronic device according to claim 10, further comprising executing a display mode, wherein the display mode, the touch sensing mode, and the force sensing mode are executed separately.

14. The driving method of the touch electronic device according to claim 13, wherein a fixed voltage is applied to the first sensing electrode in the display mode, and a pulse voltage is applied to the first sensing electrode in the touch sensing mode.

15. The driving method of the touch electronic device according to claim 13, wherein the display mode is divided into multiple display intervals in a frame period, and the multiple display intervals are not continuous with respect to each other.

16. The driving method of the touch electronic device according to claim 10, wherein the touch sensing mode is divided into multiple touch sensing intervals in a frame period, and the multiple touch sensing intervals are not continuous with respect to each other.

17. The driving method of the touch electronic device according to claim 10, wherein the force sensing mode is divided into multiple force sensing intervals in a frame period, and the multiple force sensing intervals are not continuous with respect to each other.

* * * * *